United States Patent
Godridge et al.

(10) Patent No.: US 8,902,618 B2
(45) Date of Patent: Dec. 2, 2014

(54) METHOD OF OPERATING AN INVERTER AND INVERTER CONTROL ARRANGEMENT

(75) Inventors: Paul Godridge, Cheadle (GB); Rodney Jones, Stoke on Trent (GB)

(73) Assignee: Siemens Aktiengesellschaft, Munich (DE)

( * ) Notice: Subject to any disclaimer, the term of this patent is extended or adjusted under 35 U.S.C. 154(b) by 643 days.

(21) Appl. No.: 12/938,460

(22) Filed: Nov. 3, 2010

(65) Prior Publication Data

US 2011/0103110 A1    May 5, 2011

(30) Foreign Application Priority Data

Nov. 5, 2009   (EP) ..................................... 09013909

(51) Int. Cl.
    *H02M 7/5383*     (2007.01)
    *H02M 7/5387*     (2007.01)
    *H02J 3/38*     (2006.01)
    *H02M 7/44*     (2006.01)

(52) U.S. Cl.
    CPC .......... *H02M 7/53875* (2013.01); *Y02E 10/763* (2013.01); *Y02E 10/725* (2013.01); *H02J 3/386* (2013.01)
    USPC ............................... 363/74; 363/95

(58) Field of Classification Search
    USPC .................. 363/74, 95, 97, 98, 131, 132, 120
    See application file for complete search history.

(56) References Cited

U.S. PATENT DOCUMENTS

| | | | | |
|---|---|---|---|---|
| 5,388,041 A | * | 2/1995 | Carpita | ............................ 363/98 |
| 5,751,565 A | * | 5/1998 | Faulk | ............................... 363/41 |
| 5,811,949 A | * | 9/1998 | Garces | ........................... 318/448 |
| 6,263,018 B1 | | 7/2001 | Lee | |
| 6,466,465 B1 | | 10/2002 | Marwali | |
| 2004/0062062 A1 | * | 4/2004 | Lee et al. | ......................... 363/37 |
| 2005/0083850 A1 | * | 4/2005 | Sin et al. | ........................ 370/252 |
| 2006/0109039 A1 | * | 5/2006 | Wu | ................................. 327/172 |
| 2007/0159866 A1 | * | 7/2007 | Siri | ................................. 363/95 |
| 2007/0187955 A1 | | 8/2007 | Erdman et al. | |
| 2007/0216373 A1 | | 9/2007 | Smedley et al. | |
| 2009/0147549 A1 | * | 6/2009 | Jones et al. | ...................... 363/37 |
| 2009/0310385 A1 | * | 12/2009 | Maksimovic et al. | ........ 363/21.1 |

FOREIGN PATENT DOCUMENTS

| | | | |
|---|---|---|---|
| EP | 75357 A1 | * | 3/1983 |
| EP | 1986315 A2 | | 10/2008 |
| JP | 2002354797 A | * | 12/2002 |
| WO | WO 2009083447 A2 | | 7/2009 |

* cited by examiner

*Primary Examiner* — Adolf Berhane
*Assistant Examiner* — Henry Lee, III

(57) ABSTRACT

A method of operating an inverter for converting a DC power into AC power by use of a pulse width modulation switching scheme is provided is disclosed. The inverter is controlled by use of the pulse width modulation switching scheme to provide an alternating current based on a current demand signal defining an alternating current provided by the inverter. An upper current threshold and a lower current threshold are provided. An instantaneous value of the alternating current is measured. When the instantaneous value of the alternating current overshoots the upper current threshold or undershoots the lower current threshold, the pulse width modulation switching scheme is replaced by an amended switching scheme which controls the instantaneous value of the alternating current to be between the upper current threshold and the lower current threshold. The upper current threshold and the lower current threshold oscillate with at least one alternating phase.

15 Claims, 6 Drawing Sheets

METHOD OF OPERATING AN INVERTER AND INVERTER CONTROL ARRANGEMENT

CROSS REFERENCE TO RELATED APPLICATIONS

This application claims priority of European Patent Office application No. 09013909.8 EP filed Nov. 5, 2009, which is incorporated by reference herein in its entirety.

FIELD OF INVENTION

The present invention relates to a method of operating an inverter for converting DC power into AC power by use of a pulse width modulation scheme. In addition, the present invention relates to an inverter control arrangement for controlling conversion of DC power to AC power by an inverter using a pulse width modulations scheme.

BACKGROUND OF INVENTION

Converters that are based on pulse width modulation schemes are equipped with switches for connecting converter AC outputs, which are typically connected to an AC equipment or a grid for power transmission, in an alternating fashion to a high or low voltage level of a DC link through DC converter inputs. The switching is performed on the basis of a pulse width modulation scheme which provides the timing for connecting the AC outputs to and disconnecting the AC outputs from the voltage levels of the DC link. During the time an AC output is connected to the DC link a current flows from the link to the output, or vice versa.

Inverters are often used to connect wind turbines to a grid. Wind turbines convert wind energy to electrical energy by using the wind to drive the rotor of a generator, either directly or by means of a gear box. The AC frequency that is developed at the stator terminals of the generator, often called "stator voltage" is directly proportional to the speed of rotation of the rotor. The voltage at the generator terminals also varies as function of speed and, depending on the particular type of generator, on the flux level. For optimum energy capture, the speed of rotation of the output shaft of the wind turbine will vary according to the speed of the wind driving the wind turbine blades. To limit the energy capture at high wind speed, the speed of rotation of the output shaft is controlled by altering the pitch of the turbine blades. Matching of the variable voltage and frequency provided by the generator to the nominally constant voltage and frequency of the grid can be achieved by using a power converter.

In a first stage of a power converter a rectifier is used to convert the AC voltage delivered from the generator to a DC voltage with high voltage level and a DC voltage with a low voltage level. These DC voltages are fed to a so called DC link as a high voltage level of the link and a low voltage level of the link. In a second stage, an inverter which is connected to the DC link uses switches driven by a pulse width modulation scheme, as mentioned above, to convert the DC voltage to an AC voltage matching the voltage level, the grid frequency and the power factor requested by the grid operator. Instead of the power factor, which is given by the ratio of the real power (P) to the apparent power (S) (which is the sum of the squares of the real power and the reactive power) the inverter can also be controlled on the basis of a real power demand and a reactive power demand. Furthermore, instead of controlling the inverter directly according to the power factor, or the real and reactive power, it can also be controlled by current demand signals since the voltage amplitude is usually a fixed parameter in the grid so that the power fed to the grid by the inverter can be defined by current amplitudes and phase angles between the current and the voltage. Hence, a power factor demand signal or demand signals for active and reactive power can be converted to current demand signals which are then used for controlling the inverter, i.e. for determining the timing of pulses causing the switches to open and close. Such mode of control is known as current control.

A typical power converter including an active rectifier and an active inverter for converting the AC power of a wind turbine generator to DC power and the DC power again to AC power is, for example, described in US 2009/0147549 A1.

An inverter converting a DC voltage into AC voltage by use of a so called sliding mode control, in which the inverter is controlled as a result of comparison of an output state with a reference quantity and a switching law which is dependent on a state error, is disclosed in U.S. Pat. No. 5,388,041.

US 2007/0216373 A1 discloses three phase controllers for power converters having a control core which can be implemented using different control techniques, in particular one cycle control, which is a special pulse width modulation control method, and sliding mode control.

With a grid connected inverter, for example of a wind turbine, any sudden changes in grid voltage such as those which occur during a grid fault have to be accompanied by a matched rapid change of inverter terminal voltage, in order to limit the size of the inverter current transient and to allow the inverter to maintain current control and stay connected to the grid. Typically, the time in which the inverter output voltage has to be changed to adapted to the change in grid voltage is much shorter than the update time of the control system determining output voltage state. Failure to modify the actual inverter output voltage rapidly in these conditions leads to very high current flowing in the inverter module which may be above the instantaneous over-current threshold for the inverter module which then may lead to a trip condition of the inverter and, hence, of the wind turbine, which is to be avoided since it is often a requirement to stay connected to the grid during such a grid fault.

Additional features are therefore required to maintain the output current below instantaneous over-current levels with a time constant appropriate to the circuit parameters, i.e. DC link voltage, network impedances, network filter impedances, power semi-conductor device over current protection thresholds, etc. Furthermore, features are required in the controls to re-establish control of the current in a dynamic and robust manner.

The issue of protecting a power semi-conductor device from tripping or becoming stressed has previously been addressed as follows:

Typically, existing schemes add a fast acting current limiting block after the normal current control function. This current limiting block is based on fixed positive and negative thresholds below/above which the output current is not permitted. When an output current of a phase is above the current limiting threshold, or below, in case the instantaneous current is negative, the power semi-conductor device managing that current is turned off, so limiting further increase in current. The power semi-conductor device is turned back on against some lower threshold condition being achieved, or a time delay. These thresholds are set at some margin below the instantaneous over-current thresholds.

The issue of maintaining robust control of the current from the inverter to the grid has previously been addressed as follows: In a conventional vector controlled inverter, the current controller requires additional gain during such a grid voltage transient. This is achieved by means of a grid voltage feed-forward term in the current controller. In the steady state, this feed-forward term is heavily filtered to maximise stability. During the transient at the start and the end of a grid fault, this feed-forward term is very lightly filtered. This light filtering is a compromise between dynamic performance and grid stability.

Current limiting achieved by a dual mode control of a pulse width modulation motor drive is described in U.S. Pat. No. 4,904,919. In this dual mode control, a method and a control circuit for switching between sine-triangle modulation and hysteresis modulation in a pulse width modulation drive are used to overcome difficulties which arise in sine-triangle modulation during transient conditions which may cause large undesirable instantaneous values for the current in the pulse which modulated generated wave. To prevent from such undesirable instantaneous values for the current a sine-triangle pulse width modulation scheme is overridden with a hysteresis modulation scheme in which the phase voltage command is controlled in response to the magnitude of a sensed phase current reaching a hysteresis band upper limit so as to produce a limit current represented by the threshold. At a later time there is a reversion to sine-triangle modulation in response to the magnitude of the sensed phase current decreasing to a hysteresis band lower limit.

SUMMARY OF INVENTION

With respect to the mentioned prior art it is an objective of the present invention to provide a method of operating an inverter for converting DC power to AC power by use of a pulse width modulation scheme which is advantageous in over-current protection. It is a further objective of the present invention to provide an inverter control arrangement for controlling conversion of DC power to AC power by an inverter using a pulse width modulation scheme, which is advantageous in over current protection.

These objectives are solved by a method of operating an inverter according and by an inverter control arrangement according to the independent claims. The depending claims contain further developments of the invention.

According to the inventive method of operating an inverter for converting DC power to AC power by use of a pulse width modulation switching scheme the inverter is controlled by the pulse width modulation switching scheme to provide at least one alternating current on the basis of at least one current demand signal defining at least one alternating current to be provided by the inverter. Furthermore, an upper current threshold is provided which must not be overshot by the at least one alternating current, and a lower current threshold is provided which must not be undershot by the at least one alternating current. The instantaneous value of the at least one provided alternating current is measured and, in case it is detected that the instantaneous value of the at least one alternating current overshoots the upper current threshold or undershoots the lower current threshold, the pulse width modulation switching scheme is replaced by an amended switching scheme which controls the instantaneous value of the at least one alternating current to be between the upper current threshold and the lower current threshold. According to the invention, the upper current threshold and the lower current threshold oscillate with at least one alternating phase, e.g. in phase with the at least one alternating current, as defined by the at least one current demand signal. In particular, the upper current threshold and the lower current threshold would typically be given as sinusoidal type reference values that the inverter output current must not overshoot and undershoot, respectively.

In particular the pulse width modulation scheme may be replaced by a sliding mode control when an instantaneous over-current is detected.

By adapting sinusoidal type upper and lower thresholds the thermal stress on the power switches making up the inverter, which are typically semi-conductor devices, is minimized. Compared to the state of the art current limiting techniques in which a current overshooting a singular fixed upper current threshold is limited to the upper threshold and a current undershooting a singular fixed lower current threshold is limited to the lower threshold, the inventive method limits the stress on the switching devices of the inverter. The state of the art current limiting would result in an output waveform of the inverter being a truncated sinusoidal wave. The root mean square (rms) of such a wave form may be 1.41 times as great as the root mean square of a not truncated sinusoidal wave of the same amplitude, and so the thermal loss in the switches becomes approximately two times as great as that that would result from a sinusoidal wave form of the same amplitude. Although grid fault events are short lived, e.g. 100 milliseconds to three seconds typically, the thermal stress that is placed on switches can be significant and ultimately a factor in dimensioning the switches. With the inventive method, the thermal stress during the grid fault can be reduced which in turn lowers the limits for dimensioning the switches.

In the invention, the control software may be based upon a standard vector control, executing in software on an regular period. Each software scan/execution period, the software calculates the pulse width modulation switching times for the next period. Additionally, the software calculates the permissible upper and lower limit values (thresholds) for the instantaneous inverter currents for the next period. In other words, the current thresholds can be derived from the current demand signal. Then, during the next controller period, the controller hardware creates the power semi-conductor device switching edges at the calculated times and accumulates inverter current feedbacks.

The modification done to the switching scheme acts to maintain the instantaneous phase current back within the upper and lower limit values. This can, for example, be achieved by switching off on one or both devices in a phase of a two level inverter, or even turning on a device that was previously switched off. Such techniques are equally applicable to two level and multi-level inverters.

Deriving the current thresholds from the current demand signal may be done by adding offsets to the current demand signal, or by multiplying the current demand signal by gain factors. In addition, it is possible to derive the current thresholds by adding offsets and multiplying by gain factors. If only adding offsets is involved, the upper current threshold may be derived from the current demand signal by adding a positive offset and the lower current threshold may be derived from a current demand signal by adding a negative offset. If, on the other hand, no offset is involved, the upper current threshold may be derived from the current demand signal by multiplying the current demand signal by a gain factor larger than one and the lower current threshold may be derived from the current demand signal by a gain factor smaller than one. If both, offsets and gain factors, are involved positive or negative offsets can be combined with gain factors larger or smaller than one for calculating the upper and lower current threshold. Hence, using an offset and a gain factor at the same time increases flexibility in defining the thresholds. Additionally, these thresholds may be clamped within upper and lower limits.

As has already been mentioned, the inverter control may be performed in time steps at a first rate with the current demand signal being updated every time step. During such a time step the current demand signal is constant. The current thresholds are also calculated from the current demand signal every time step. However, the current thresholds may be recalculated at least once during a time step by extrapolating the angle of the current demand signal over this time step. By this measure, the rate of updating the thresholds can be made higher than the rate of updating the current demand signal which allows for a faster response to instantaneous over-currents.

In the amended switching scheme the switching frequency may be limited, for example, by means of a minimum pulse timer, or by means of hysteresis bands on the current thresholds. A combination of minimum pulse timer and hysteresis bands is also possible. Limiting the switching frequency is done to take into account that each switching process dissipates power in a semi-conductor switching device. In case the switching frequency is too high too much power is dissipated so that the switching devices experience thermal stress. High switching frequencies may, for example, occur if a sliding mode control is used in the modified switching scheme if the state error is or approaches zero. Note that it may also be possible to permit a higher switching frequency for a limited number of switching events subject to the thermal limits of the power semi-conductor devices being respected.

The method may return to the regular pulse width modulation scheme if the upper current threshold is not overshot and the lower current threshold is not undershot by the instantaneous value of the at least one alternating current for a given period of time. Alternatively, return to the regular pulse width modulation scheme may be done by providing additional thresholds below the upper threshold and above the lower threshold and returning to the regular pulse width modulation scheme when it is detected that the instantaneous current has returned to between these additional thresholds.

In a further development of the inventive method the alternating current to be provided by the inverter is a three phase alternating current. An upper current threshold and a lower current threshold are then provided for each phase current of the three phase alternating current. Moreover, the instantaneous values of the phase currents of the three phase alternating current are measured and, in case it is detected that the instantaneous value of at least one phase current of the three phase alternating current overshoots its upper current threshold or undershoots its lower current threshold, the pulse width modulation scheme is replaced by an amended switching scheme. Controlling conversion of a DC power to a three phase AC power is one of the most important applications of the present invention since it can be used in connecting power generators, like for example wind turbines, to power grids.

The present invention also provides an inverter control arrangement for controlling conversion of DC power to AC power by an inverter using a pulse width modulation switching scheme. The inverter control arrangement comprises:

A current controller for establishing the at least one voltage demand signal on the basis of at least one current demand signal, the current controller having at least one current demand signal input for receiving the current demand signal and at least one voltage signal output for outputting the at least one voltage demand signal;

a pulse width modulation generator comprising at least one voltage signal input connected to the at least one voltage signal output of the current controller to receive the voltage demand signal, and a gate drive command signal calculator for establishing gate drive command signals on the basis of the at least one voltage demand signal according to a pulse width modulation switching scheme for generating at least one alternating current; and a current limiter for limiting the at least one alternating current, the current limiter comprising at least one upper current threshold signal input for receiving an upper current threshold signal, at least one lower current threshold signal input for receiving a lower current threshold signal, a current feedback input for receiving a current feedback signal from the at least one alternating current, at least a first comparator for comparing the current feedback signal with the upper current threshold signal, at least a second comparator for comparing the current feedback signal with the lower current threshold signal, and means for amending the switching scheme if the alternating current overshoots the upper current threshold or undershoots the lower current threshold.

The current controller further comprises means for calculating, on the basis of the at least one current demand signal, at least one oscillating upper current threshold value and at least one oscillating lower current threshold value both oscillating in phase with the alternating current as defined by the at least one current demand signal and for establishing an upper current threshold signal representing the oscillating upper current threshold value and a lower threshold current threshold signal representing the oscillating lower current threshold value. Said means could, for example, be implemented as one or more application specified integrated circuits (ASIC), as an FPGA (Field-programmable gate array) or other programmable logic device, or as a general purpose central processor unit (CPU).

In addition, the current controller comprises at least one upper current threshold signal output connected to the at least one upper current threshold signal input of the current limiter, and at least one lower threshold signal output connected to the at least one lower current threshold signal input of a current limiter.

The inventive inverter control arrangement is adapted to performing the inventive method of operating an inverter and, hence, achieves the same effects and advantages as they have already been discussed with respect to the inventive method.

The current controller may further comprise at least one first adder for deriving the at least one oscillating upper current threshold value by adding a first value to the current demand signal and at least one second adder for deriving the at least one oscillating lower current threshold value by adding a second value to the current demand signal. Alternatively, or additionally, the current controller may comprise at least one first multiplier for deriving the at least one oscillating upper current threshold value by multiplying the current demand signal by a first gain factor and at least one second multiplier for deriving the at least one oscillating lower current threshold value by multiplying the current demand signal by a second gain factor. While the first gain factor may, in particular, be one or larger than one the second gain factor may, in particular, be one or smaller than one. However if multipliers and adders are used together a wide variety of values to be added to the current demand signal for deriving the upper and lower thresholds as well as a large variety of gain factors by which the current demand signal may be multiplied to derive the upper and lower current thresholds can be combined.

The inverter control arrangement may further comprise a minimum pulse timer and/or a hysteresis comparator for providing the amended switching scheme.

In a particular implementation of the inverter control arrangement, which is, for example, suitable for use with power converters of wind turbines, the arrangement is adapted to controlling conversion of a DC power to three phase AC power by an inverter by use of a pulse width modulation switching scheme. In this implementation of the inverter control arrangement the current controller is adapted to establishing at least two voltage demand signals on the basis of at least two current demand signals and has at least two current demand signal inputs for receiving the at least two current demand signals and at least two voltage signal outputs for outputting the at least two voltage demand signals;

In addition, the pulse width modulation generator of this implementation comprises at least two voltage signal inputs connected to the voltage signal outputs of the current controller to receive the voltage demand signals, and a gate drive command signal calculator for establishing gate drive command signals on the basis of the at least two voltage demand signals according to a pulse width modulation switching scheme.

Furthermore, the current limiter of this implementation is adapted to limiting the phase currents of the three phase alternating current. It comprises at least two current feedback signal inputs for receiving current feedback signals from at least two of the phase currents of the three phase alternating current, at least two current threshold signal inputs for receiving an upper current threshold signals for each of the at least two phase currents and at least two lower threshold signal inputs for receiving lower current threshold signals for each of the at least two phase currents. In addition, the current limiter comprises, for each of the current feedback signals, a first comparator for comparing the respective phase current feedback signal with its upper current threshold signal and a second comparator for comparing the respective phase current feedback signal with its lower current threshold signal. Note, that the third upper and lower current threshold values may possibly be derived from the first and second upper and lower current threshold values if the phase current in a balanced three phase AC currents add to zero. However, the three the third upper and lower current threshold values need not necessarily add to zero given that the thresholds have a mix of sinewaves with gains and offsets.

In particular, the current limiter may comprise three current feedback signal inputs since, in case of a grid fault, the phase currents possibly do not sum up to zero anymore so that the third phase current can not be derived from the two other phase currents.

Furthermore, the current limiter comprises a means, for example, an ASIC, an FPGA or a CPU, for amending the switching scheme with respect to at least one of the phased currents if it is detected that the respective instantaneous phase current overshoots its upper current threshold or undershoots its lower current threshold.

According to the invention, the current controller comprises means, for example an ASIC or a CPU or equivalent (could be dsp (digital signal processor), analog computer, parallel processor or equivalent), for calculating, on the basis of the current demand signals, an oscillating upper current threshold value and an oscillating lower current threshold value for at least two phase currents of the alternating current, both upper and lower current threshold values oscillating in phase with the respective phase current as defined by the current demand signals, and for establishing, for each of said at least two phase currents, an upper current threshold signal representing the oscillating upper current threshold value and a lower current threshold signal representing the oscillating lower threshold value. At least two upper current threshold signal outputs of the current controller are connected to the upper current threshold signal inputs of the current limiter and at least two lower current threshold signal outputs of the current controller are connected to the lower current threshold signal inputs of the current limiter.

Note, that the inputs and outputs mentioned above do not necessary need to be physical inputs/outputs but can also be logical inputs/outputs. Such logical input/outputs can, for example, be realised by using single physical input/output and a time multiplexing scheme. Furthermore, inputs and outputs could be provided in form of a bus structure, for example.

According to a further aspect of the present invention a computer program product is provided which may, in particular, be stored on a computer usable medium. The computer program product comprises computer readable program means for causing the computer to execute the inventive method of operating an inverter.

BRIEF DESCRIPTION OF THE DRAWINGS

Further features, properties and advantages of the present invention will become clear from the following of description of embodiments of the invention in conjunction with the accompanying drawings.

DETAILED DESCRIPTION OF INVENTION

Figure 1:
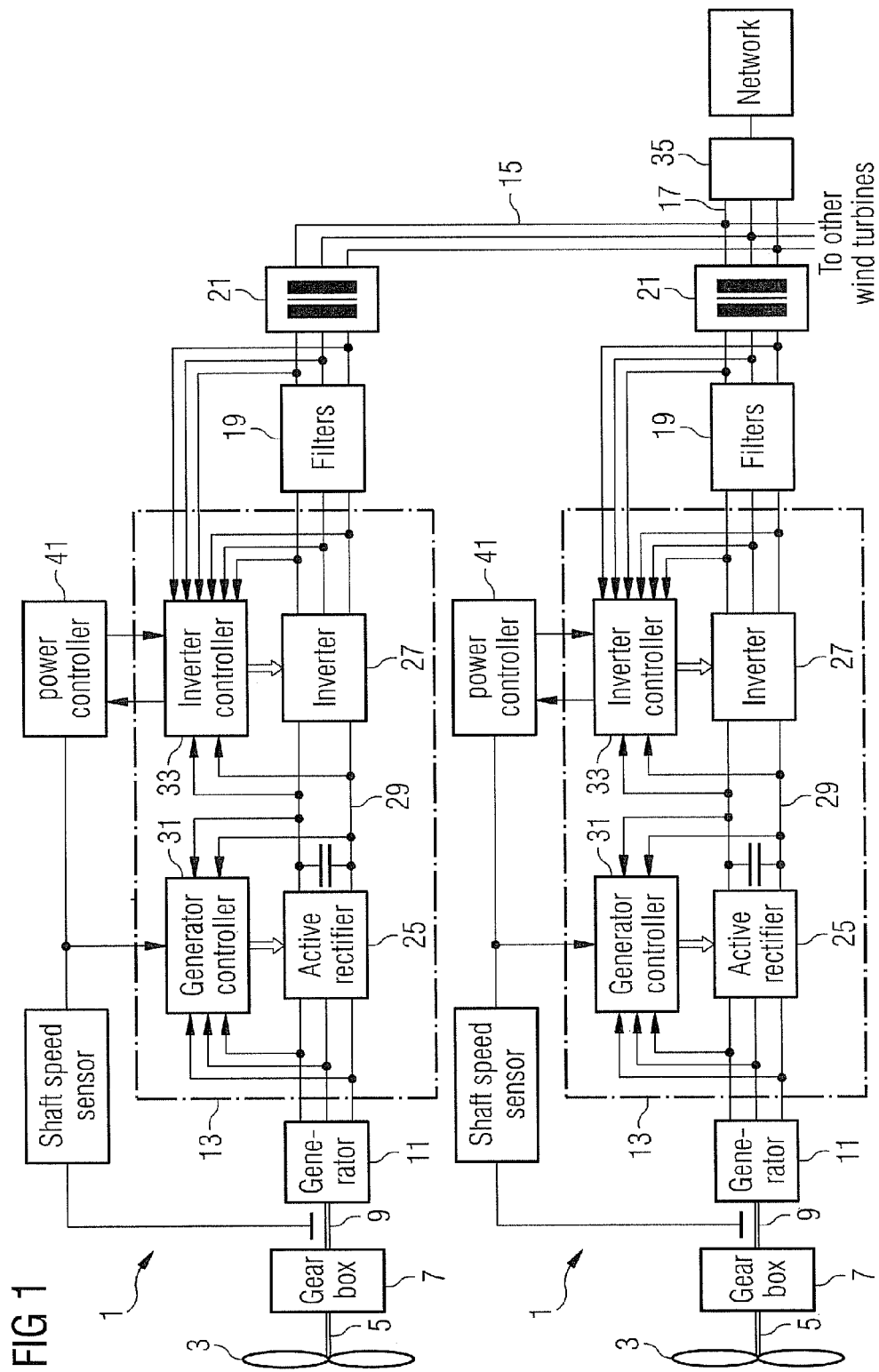
FIG. 1 shows for the electrical equipment of a wind turbine.

FIG. 1 shows two of a number of wind turbines forming a wind farm in a schematic view. In particular, the Figure shows the electrical equipment of the wind turbines for controlling the generators and the power output.

Oftentimes, a number of wind turbines 1 are connected together to define a wind farm in which the wind turbines are connected in parallel to a wind farm transformer 35 by a collector cable 15. The wind farm transformer 35 is in turn connected to a nominally fixed frequency utility grid (labelled network in the Figure). Each wind turbine 1 is connected to the collector cable 9 through an input line reactor 19 and a wind turbine transformer 21.

Each wind turbine 1 comprises a rotor 3 with a rotor shaft 5 transmitting the rotational momentum of the turning rotor 3 to a gear box 7. In the gear box 7, a transmission of the rotation to an output shaft 9 with a certain transmission ratio takes place. The output shaft 9 is fixed to the rotor of an AC generator 11 which transforms the mechanical power provided by the rotation of the output shaft 9 into the electrical power. The AC generator 11 may either be a synchronous generator or an asynchronous generator (singly-fed or doubly-fed). In a synchronous generator, the rotor rotates with the same rotational frequency as a rotating magnetic field produced by a stator of the generator. In contrast, in an asynchronous generator, the rotational frequencies of the stator magnetic field and the rotor are different. The difference in rotational frequency is described by the slip of the generator. The generators 21 are variable speed generators, i.e. the rotational speed of the rotor is allowed to vary depending on the wind conditions. Alternatively, the gearbox may be omitted and a PM machine may be used.

To supply a fixed frequency AC power to the utility grid to which the wind turbines are connected, each wind turbine 1 is equipped with a power electronic converter 13 which converts parts or the whole of the varying frequency electricity delivered by the generators 11 to an electrical power having a fixed frequency according to the requirements of the utility grid. In addition, the power electronic converters 13 control the output power of the electricity supplied by the wind turbines 1.

The power output is controlled by the power electronic converters 13 of the individual wind turbines 1 according to a power factor request or, alternatively, according to an active power request and a reactive power request. Each power electronic converter 13 comprises an active rectifier 25 for producing a DC voltage with a high voltage level and a low voltage level from the variable frequency AC voltage provided by the wind turbines 1, an inverter 27 producing a fixed frequency AC voltage from the DC voltage, and a DC link 29 connecting the active rectifier 25 with the inverter 27. Each power electronic converter 13 further includes a generator controller 31 which controls the torque reacted by the AC generator 11 by controlling the stator current or stator voltage of the AC generator 11, and an inverter controller 33 controlling the output current of the power electronic converter 13 to supply three-phase AC power having leading or lagging currents at an angle specified by the requested power factor.

Figure 2:
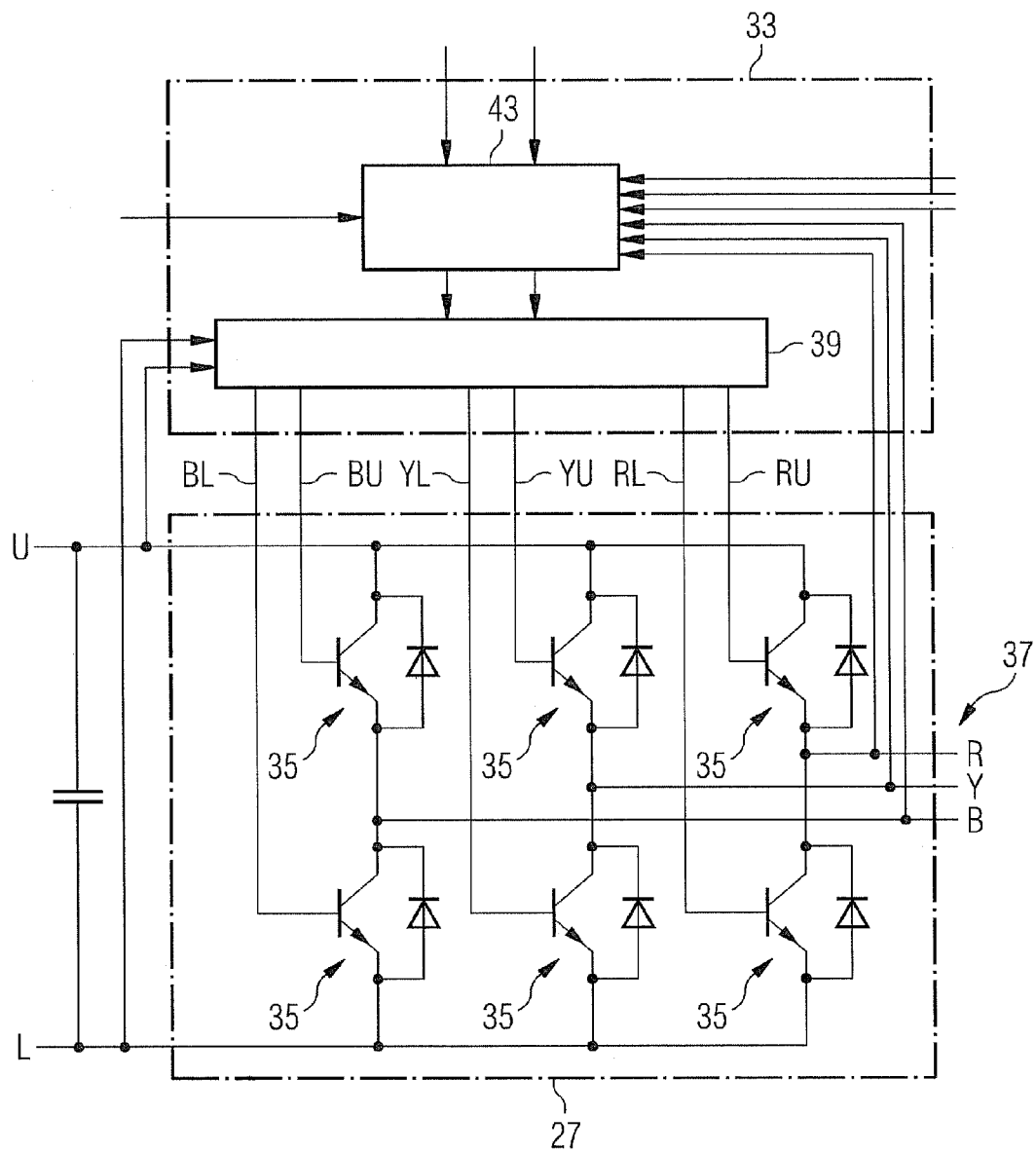
FIG. 2 shows an inverter which is part of the wind turbine electrical equipment shown in FIG. 1.

The inverter controller 33 receives the voltage levels on the DC link 29, the current levels at the inverter output 37, the voltage levels between the filters 19 and the transformer 21 and current control signals from a power controller 41 which generates the current demand signals according to the requested power factor. The structure of the inverter 27 and the general structure of the inverter controller 33 are shown in FIG. 2.

The inverter 27 comprises three pairs of active switching devices 35, like isolated gate bipolar transistors (IBT), bipolar junction transistors, field effect transistors, darlington transistors or gate turn-off thyristors. In the present embodiment, each pair of active switching devices 35 includes two isolated gate bipolar transistors as active switching devices 35. The pairs of active switching devices 35 are connected between the high voltage level and the low voltage level of the DC link 29. The three lines of the inverter output 37 are each connected to a different one of the pairs of active switching devices 35, in the middle between the switching devices 35. By a suitable scheme of switching the active switching devices 35 the DC voltage on the voltage link 29 can be transformed into a three-phase AC voltage at the inverter output 37 with current levels so as to match the requested power factor. The switching is done according to pulse width modulated commutation signals provided by a pulse width modulation generator 39 which is part of the inverter controller 33 and which receives voltage demand signals by a current controller device 43 of the inverter controller 33.

Figure 3:
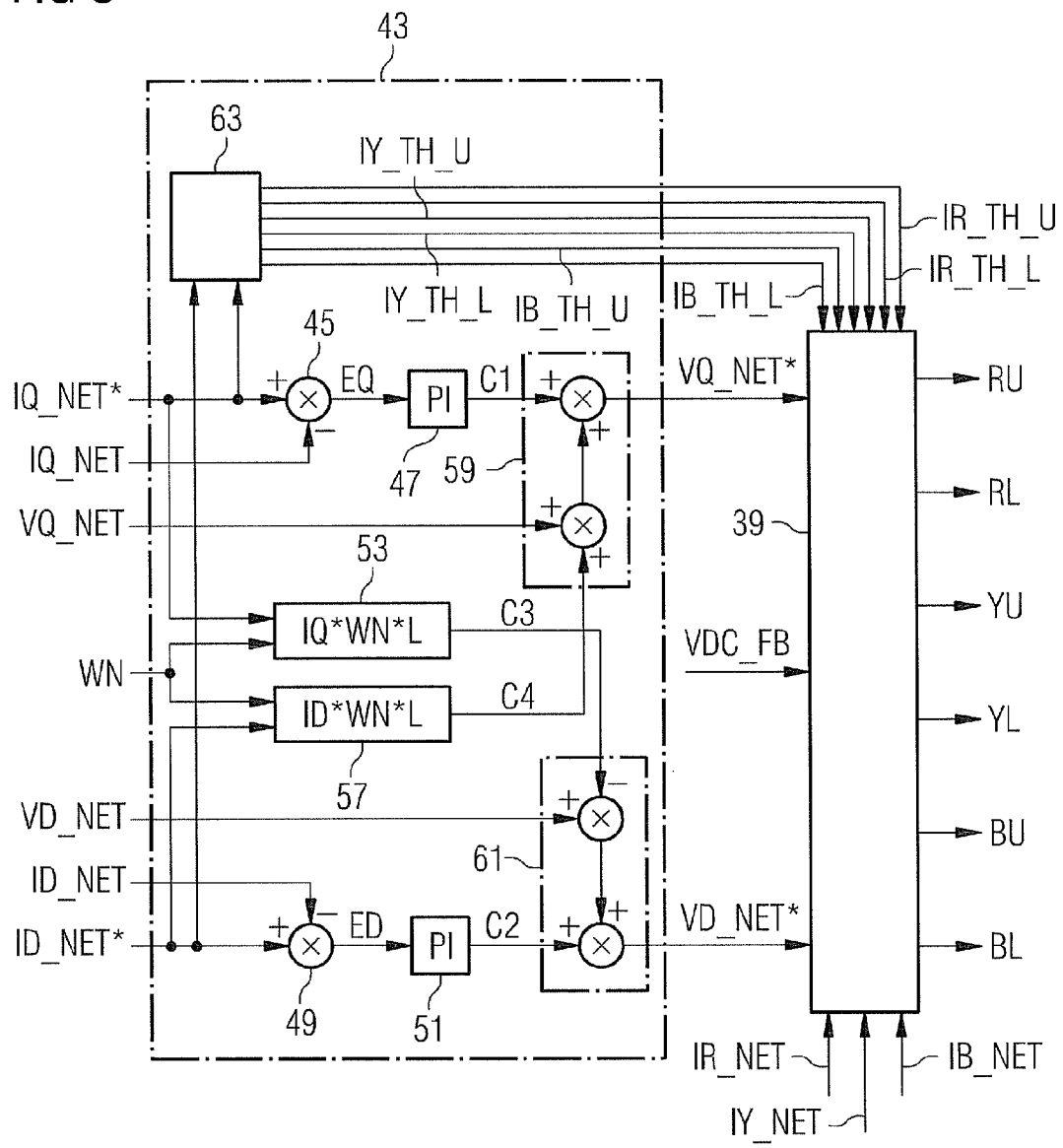
FIG. 3 shows the inverter controller of FIG. 2.

The inverter controller is shown in FIG. 3 in greater detail. As mentioned, the inverter controller comprises a current controller device 43 and a pulse width modulation generator 39. The current controller device 43 determines voltage demand signals VQ_NET*, VD_NET* on the basis of current demand signals IQ_NET* and ID_NET*. The voltage demand signals VQ_NET* and VD_NET* are used by the pulse width modulation generator 39 to determine gate drive command signals RU, RL, YU, YL, BU and BL for the active switching devices 35 in the inverter 27 which define the switching times of the switching devices 35.

The current demand signals IQ_NET* and ID_NET* are calculated by the power controller on the basis of a power factor request. They are defined in a rotating reference frame, the so called rotating field reference frame, which rotates in synchronicity with the grid voltage. In this reference frame, a balanced three phase current can be expressed in terms of a direct axis current ID flowing in quadrature with the grid voltage and a quadrature axis current IQ flowing in phase with the grid voltage. These two currents can be derived from the three phase currents by using the fact that the three phase currents are balanced, i.e. they sum up to zero, so that each of the phase currents can be determined from the other two phase currents. Hence, the three phase currents can be transformed into two independent currents which are represented by different combinations of the phase currents. A third combination of currents is used, namely the sum of all three phase currents, to define a third current component which is, however, always zero since the three AC phase current is balanced. The two non-zero or zero currents can be expressed in a rotating reference frame rotating with the with the grid voltage by use of a suitable coordinate transformation. In such a rotating reference frame a balanced three phase AC current can be represented by two vectors representing a current flowing in the direction of the flux vector, i.e. the so called direct axis of the rotating reference frame, and a current flowing in phase with the grid voltage, i.e. in the direction of the so called quadrature axis of the rotating reference frame. While the current flowing in quadrature with the grid voltage is the direct axis current ID the current flowing in phase with the grid voltage is current IQ. The advantage of the representation of the AC currents in form of a direct axis current ID and a quadrature axis current IQ is that, in the rotating reference frame, these two currents are direct currents in the steady state and the steady state error can be controlled to zero by a proportional-integral controller (PI-controller).

The current controller device 43 comprises two current demand inputs, a first current demand input for receiving the quadrature axis current demand signal IQ_NET* and a second current demand input for receiving the direct axis current demand signal ID_NET*, two current feedback inputs, namely a first current feedback input for receiving the quadrature axis current feedback IQ_NET and a second current feedback input for receiving the direct axis current feedback ID_NET. Both feedback signals can be derived by a suitable transformation from measurements of the three phases of the output current at the inverter output. Furthermore, the current controller comprises two voltage feedback inputs, namely a first voltage feedback input for receiving the quadrature axis voltage feedback VQ_NET and a second voltage feedback input for receiving the direct axis voltage feedback signal VD_NET. Like the current feedback signals the voltage feedback signals can be derived by using a suitable transformation from measurements of the three phases of the output voltage measured between the filter 19 and the transformer 21a. A further input is present at the current controller 43 for receiving the frequency WN of the network voltage wave form.

The voltage demand signals VQ_NET*, VD_NET* are derived in the current controller device in the following manner: In a first adder, the quadrature axis current feedback signal IQ_NET is subtracted from the quadrature axis current demand signal IQ_NET* to form a quadrature axis error signal EQ which is then received by a PI-controller 45 which produces a first control signal C1 based on this error signal EQ. Likewise, a second adder is connected to the second current demand signal input and the second current feedback signal input for receiving the respective signals. The second adder 49 subtracts the direct axis current feedback signal ID_NET from the direct axis current demand signal ID_NET* to produce a direct axis error signal ED which is output to a second PI-controller 51 which determines a second control signal C2 on the basis of the direct axis error signal ED.

Furthermore, the current controller device 43 comprises a first multiplier 53 and a second multiplier 57, the first multiplier 53 being connected to the quadrature axis current demand signal input for receiving the quadrature axis current demand signal IQ_NET* and to the frequency input for receiving the frequency WN of the network voltage wave form. The first multiplier 53 multiplies the received quadrature axis current demand signal IQ_NET* by the received frequency WN and the inductivity L of the filter 19. The result of the multiplication forms a third control signal C3 which represents a first current feed-forward term. Likewise, the second multiplier 57 is connected to the direct axis current demand signal input for receiving the direct axis current demand signal ID_NET* and to the frequency input for receiving the frequency WN of the network voltage wave form. It multiplies the direct axis current demand signal IQ_NET* by the received frequency WN and the inductivity L of the filter 19 to form a fourth control signal C4, which represents a second current feed-forward term.

A first adder arrangement is connected to the first PI-controller 47 for receiving the first control signal C1, to the second multiplier 57 for receiving the fourth control signal C4 and to the first voltage feedback input for receiving the quadrature axis voltage feedback signal VQ_NET. It calculates the first voltage demand signal VQ_NET* by summing the three received signals. The calculated quadrature axis voltage demand signal VQ_NET* is then output through a first voltage demand output to the pulse width modulation generator 39.

A second adder arrangement 61 is present in the current controller device 43 which is connected to the second PI-controller 51 for receiving the second control signal C2, to the first multiplier 53 for receiving the third control signal C3 and to the second voltage feedback input for receiving the direct axis voltage feedback signal VD_NET. It forms the sum of the three received signals to generate the second voltage demand signal, namely the direct axis voltage demand signal VD_NET*. The direct axis voltage demand signal VD_NET* is then output through a second voltage demand output to the pulse width modulation generator 39. The description with respect to FIG. 3 is that of a positive sequence only control. In fact also a control of the negative sequence current could be performed.

The pulse width modulation generator 39 establishes the individual switching commands for connecting the respective output lines R,Y,B of the inverter 27 to and disconnecting them from the upper voltage level VU of the DC link and a lower voltage level VL of the DC link by opening and closing the respective switching devices 35. The individual signals commands RU, RL, YU, YL, BU and BL are calculated by use of the total voltage magnitude V_NET=SQRT (VQ_NET*$^2$+VD_NET*$^2$), the sum of the angles $\Theta_{NET}$=ARCTAN (VD_NET*/VQ_NET*) and $\oplus$MAIN, which is a measure of the network voltage angle, and the pulse width modulation frequency, which is, for example, generated by a triangular wave generator.

The operation of the current controller 43 and the pulse width modulation generator 39 which has been described up to now is the regular operation, i.e. the operation under regular grid conditions of the utility grid. However, in case of a grid fault, undesirably large instantaneous values of the phase currents may result from a regular pulse with modulation scheme. Such undesirably high currents could lead to increased power dissipation that could damage the switching devices 35 of the inverter. Moreover, this could lead to a trip condition which is, according to many grid codes, to be avoided. Therefore, the current controller 43 shown in FIG. 3 comprises a threshold calculator which calculates for each phase current an upper and a lower current threshold value which must not be overshot or undershot, respectively. These threshold values are output as upper and lower threshold signals IR_TH_U, IR_TH_L, IY_TH_U, IY_TH_L, IB_TH_U and IB_TH_L which are received by the pulse width modulation generator 39. In addition, the pulse width modulation generator 39 receives feed back signals representing the phase currents IR, IY and IB.

Figure 4:
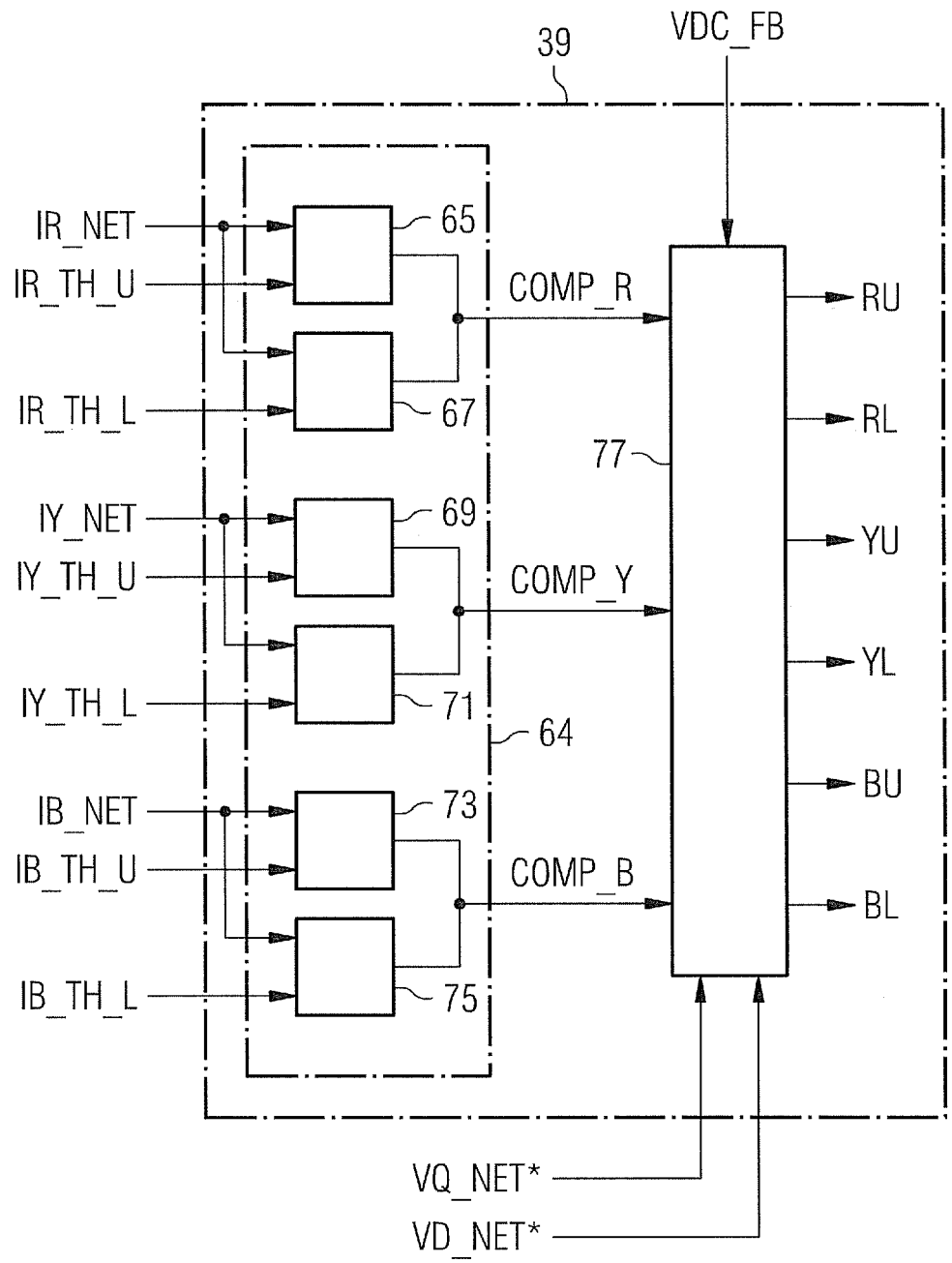
FIG. 4 shows a pulse width modulation generator used in the inverter controller.

FIG. 4 shows the pulse width modulation generator in more detail. For each phase current the pulse width modulation generator comprises a pair of hysterisis comparators comparing the respective current feed back with its upper and lower threshold values. In particular, the hysterisis comparators 65 and 67 both receive the current feed-back of the red phase. In addition, the hysterisis comparator 65 receives the upper threshold signal IR_TH_U for the red phase and the hysterisis comparator 67 receives the lower threshold signal IR_TH_L. In case the feedback signal IR of the red phase exceeds the upper threshold value IR_TH_U or falls under lower threshold value IR_TH_L the respective hysterisis comparator 65, 67 outputs a signal COMP_R. Likewise, the other two pairs of hysterisis comparators 69, 71 and 73, 75 output signals COMP_Y, COMP_B in case the respective phase current feedback IY, IB exceeds its upper threshold or falls below its lower threshold.

The pulse with modulation generator 39 further comprises a gate drive command signal calculator 77 which calculates the gate drive command signals RU, RL, YU, YL, BU and BL. During the regular operation mode of the inverter controller, i.e. in case there is no grid fault, the gate drive command signal calculator 77 calculates the gate drive command signals on the basis of a given regular pulse width modulation scheme. However, in case the gate drive command signal calculator 77 receives an output signal COMP from one of the pairs of hysterisis comparators the gate drive command signal calculator 77 switches from the regular pulse width modulation scheme to another switching scheme for the phase current for which the high level from the comparators was received. The amended switching scheme may, for example, provide the following voltage levels for controlling the instantaneous value of the respective phase current so as to keep it between its upper and lower threshold value:

$$U = U_{min} \text{ if } I\_NET - I\_NET^* > 0$$

$$U = U_{max} \text{ if } I\_NET - I\_NET^* < 0$$

where U is the output voltage level of the inverter, $U_{min}$ is a minimum DC voltage level, $U_{max}$ is a maximum DC voltage level, I_NET is a current feed back level representing the instantaneous value of the respective phase current, I_NET* is a current demand level for the respective phase. Such an implementation replaces the regular pulse width modulation scheme by a sliding mode control when an instantaneous over-current is detected.

In case the upper current threshold is overshot the (sinusoidal) upper current threshold can be used as the current demand level I_NET*, and in case the lower threshold is undershot the lower current threshold level can be used as the current demand level I_NET*. However, it is also possible to use a phase current demand signal as the current demand level I_NET*, which is derived by transforming the quadrature axis current demand signal IQ_NET* and the direct axis current demand signal ID_NET* into phase current demand signals of the three phases as represented in the stationary reference frame.

The respective phase current is kept in the amended switching mode until the respective pair of hysterisis comparators returns to a low output level. Due to the fact that hysterisis comparators are used, return to a low output level does not take place if the respective phase current is brought back into the range defined by the upper and lower thresholds but into a more narrow range. Hence, a safety margin is given for return to the regular pulse width modulation scheme.

Due to the fact that switching between the upper and the lower voltage level of the DC link is performed only on the basis of the difference between a current feedback of the respective phase and a current demand for the respective phase the switching frequencies can become rather high in case the difference between the current feedback and the current demand is zero or close to zero. However, a high switching frequency would dissipate more power in the switches than a lower switching frequency so that it is preferable to restrict the switching frequency, for example, by use of a minimum pulse timer defining a minimum pulse width. However, a higher switching frequency may be allowed for a limited number of switching events if the thermal limits of the switches are respected.

Additionally, when the pulse width modulation generator intervenes in the described manner the achieved phase voltage is deliberately different to that which had been achieved by the regular pulse width modulation scheme. If the pulse width modulation generator can calculate the phase terminal voltage that has been achieved during the amended switching mode, for example by means of low pass filter, the value of this achieved voltage can be fed back to the current controller as voltage feed-back for use in re-seeding it.

Figure 5:
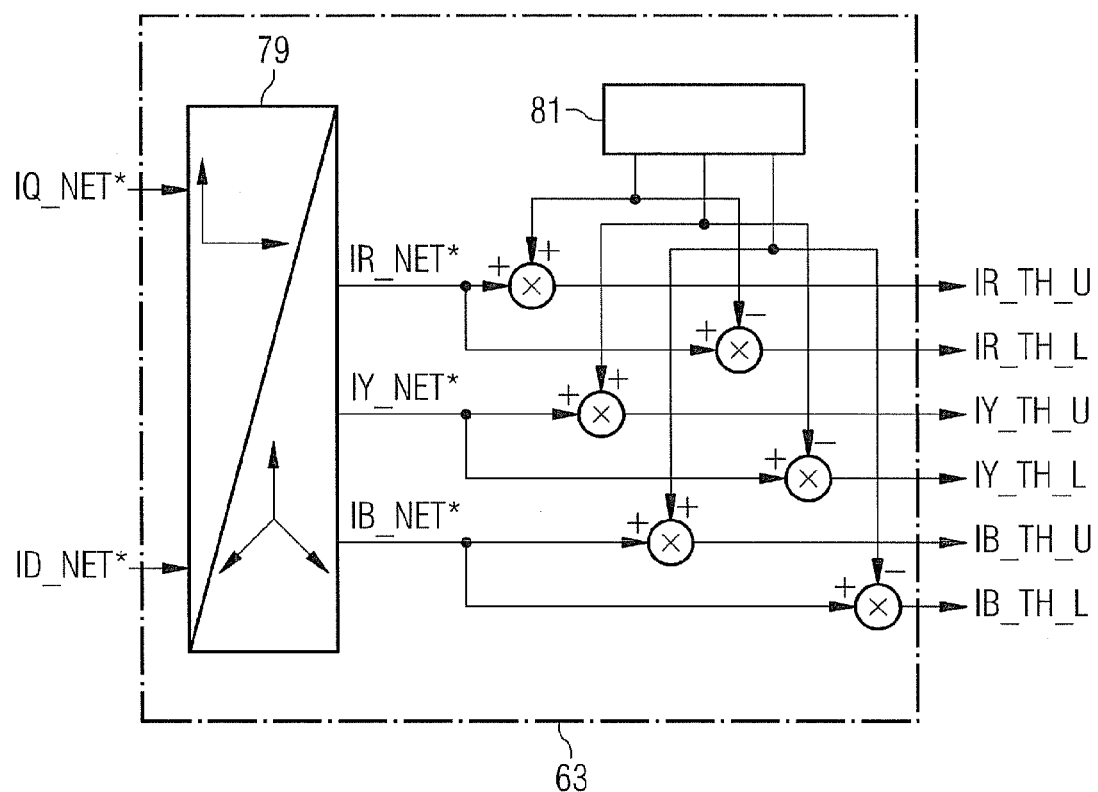
FIG. 5 shows a first alternative of a threshold calculating device used in the inverter controller.

Deriving the upper and lower threshold limits for the phase currents will now be described with respect to FIG. 5 which shows a first implementation of the threshold calculator 63. The threshold calculator 63 comprises a co-ordinate transformation unit which receives the quadrature axis current demand signal IQ_NET* and the direct axis current demand signal ID_NET*. It transforms the current demand signals which are given in reference frame rotating with the flux vector, into three phase current demand signals IR_NET*, IY_NET*, IB_NET*. Furthermore, the threshold calculator 63 comprises a memory which contains an offset value to be added or subtracted from the current demand signals IR_NET*, IY_NET*, IB_NET*. Although one offset value is enough for performing the inventive method it is also possible to provide different offset values for each phase current. Upper and lower current threshold values IR_TH_U, IR_TH_L, IY_TH_U, IY_TH_L, IB_TH_U and IB_TH_L are calculated from the respective current demand signals IR_NET*, IY_NET* and IB_NET* by adding and subtracting the offset value respectively. These threshold signals are then output to pulse width modulation generator 39.

Figure 6:
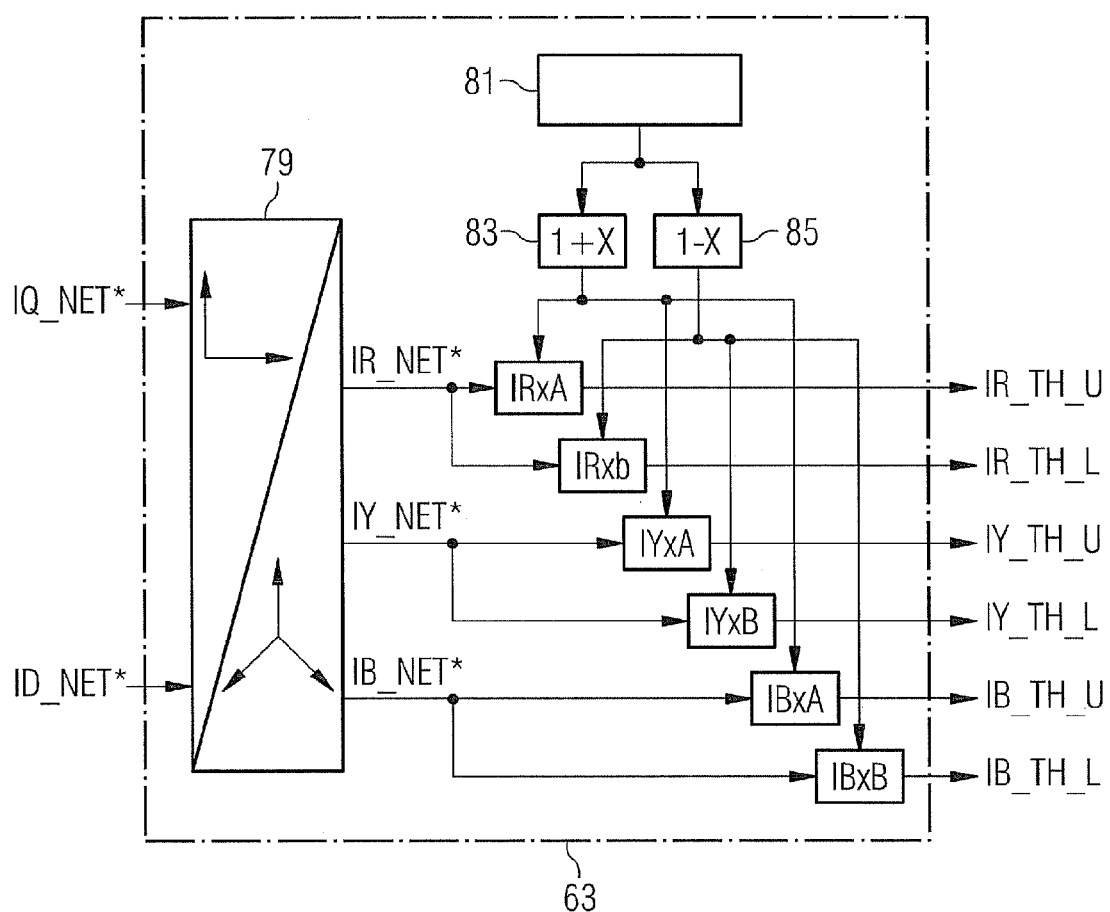
FIG. 6 shows a second alternative of a threshold calculating device used in the inverter controller.

An alternative implementation of the threshold calculator is shown in FIG. 6. To avoid repetitions, only the differences to the threshold generator shown in FIG. 5 are described. In the embodiment shown in FIG. 6, the memory 81 contains an offset X in the range between 0 and 1, for example between 0 and 0.2. This offset is received by a first gain factor forming unit 83 and added to one to form a first gain factor that is larger than one. Moreover, the offset is also received by a second gain factor forming unit 85 and subtracted from one to form a second gain factor smaller than one. The upper and lower threshold signals I_TH_U and I_TH_L for the phase currents are derived from the respective phase current demand signals I_NET* by respectively multiplying said phase current demand signals by the first gain factor (i.e. the gain factor larger than one) and the second gain factor (i.e. the gain factor smaller than one). The calculated upper and lower current threshold signals are then output to the pulse width modulation generator 39.

Although the upper an lower threshold values have been derived by adding offsets or by multiplying gain factors in the two shown embodiments of the threshold calculator the thresholds can also be calculated by a combination of adding offsets and multiplying by gain factors and can also have limits applied to these thresholds, after the gain and offsets have been applied. Furthermore, if the current demand signals are extrapolated with respect to their angle, the threshold signals can be updated one or more times during an execution time step of the current control, depending on the rate of extrapolation during this execution time step.

The invention as described in the exemplary embodiments provides a method of operating an inverter that allows for a more sophisticated control in case of grid faults. In particular, the method can also be used as a means of controlling grid current during grid faults rather than merely limiting it to a level which reduces the risk of hardware trip. Additionally, the amended scheme reduces the thermal stress on the switches of the inverter.

The invention claimed is:

1. A method of operating an inverter for converting a DC power into AC power via a pulse width modulation switching scheme, comprising:
   controlling the inverter via the pulse width modulation switching scheme to provide an alternating current at least based on a current demand signal defining an alternating current to be provided by the inverter to a power grid;
   providing a sinusoidal upper current threshold which must not be overshot by the alternating current;
   providing a sinusoidal lower current threshold which must not be undershot by the alternating current; and
   measuring the instantaneous value of the alternating current, and
   when the instantaneous value of the alternating current overshoots the sinusoidal upper current threshold or undershoots the sinusoidal lower current threshold, the pulse width modulation switching scheme is replaced by an amended switching scheme which controls the instantaneous value of the alternating current to be between the sinusoidal upper current threshold and the sinusoidal lower current threshold,
   wherein the sinusoidal upper current threshold and the sinusoidal lower current threshold oscillate with an alternating phase,
   wherein the sinusoidal upper current threshold and the sinusoidal lower current threshold are derived from the current demand signal by multiplying the current demand signal by gain factors.

2. The method as claimed in claim 1, wherein the sinusoidal upper current threshold and the sinusoidal lower current threshold are derived from the current demand signal by adding offsets.

3. The method as claimed in claim 1,
   wherein the inverter control is performed in time steps at a first rate with the current demand signal being updated every time step and being constant during a time step, and
   wherein the sinusoidal upper and lower current thresholds are calculated from the current demand signal every time step and recalculated at least once during a time step by extrapolating an angle of the current demand signal over the time step.

4. The method as claimed in claim 1, wherein a frequency of the modulation pulses is limited in the amended switching scheme.

5. The method as claimed in claim 1, wherein when the instantaneous value of the alternating current overshoots the sinusoidal upper current threshold or undershoots the sinusoidal lower current threshold the pulse width modulation switching scheme is replaced by a sliding mode control scheme.

6. The method as claimed in claim 1, further comprising returned to the regular pulse width modulation switching scheme if the sinusoidal upper current threshold is not overshot and the sinusoidal lower current threshold is not undershot by the instantaneous value of the at least one alternating current for a given period of time.

7. The method as claimed in claim 1, further comprising:
providing an additional threshold below the sinusoidal upper current threshold and an additional threshold above the sinusoidal lower current threshold; and
returning to the regular pulse width modulation scheme if the instantaneous value of the alternating current is between the additional thresholds.

8. The method as claimed in claim 1,
wherein the alternating current is a three phase alternating current,
wherein each of the phase currents is provided a sinusoidal upper current threshold,
wherein each of the phase currents is provided a sinusoidal lower current threshold,
wherein an instantaneous value is measured for each of the phase currents, and
wherein when at least one of the phase currents overshoots the sinusoidal upper current threshold for the at least one of the phase currents or when at least one of the phase currents undershoots the sinusoidal lower current threshold for the at least one of the phase currents, the pulse width modulation switching scheme is replaced by an amended switching scheme which controls the instantaneous value of the at least one of the phase currents to be between the sinusoidal upper current threshold and the sinusoidal lower current threshold of the at least one of the phase currents.

9. An inverter control arrangement for controlling conversion of DC power to AC power by an inverter using a pulse width modulation switching scheme, the inverter control arrangement, comprising:
a current controller establishes a voltage demand signal at least based on a current demand signal and includes a current demand signal input which receives the current demand signal and a voltage signal output which outputs the voltage signal;
a pulse width modulation generator includes a voltage signal input connected to the voltage signal output in order to receive the voltage demand signal, and a gate drive command signal calculator establishes gate drive command signals at least based on the voltage demand signal according to a regular pulse width modulation switching scheme for generating an alternating current to be provided by the inverter to a power grid;
a current limiter limits the alternating current, the current limiter comprises a sinusoidal upper current threshold signal input for receiving a sinusoidal upper current threshold signal, a sinusoidal lower current threshold signal input receives a sinusoidal lower current threshold signal, a current feedback signal input receives a current feedback signal from the alternating current, a first comparator compares the current feedback signal with the sinusoidal upper current threshold signal, a second comparator compares the current feedback signal with the sinusoidal lower current threshold signal, the modulation switching scheme is amended when the alternating current overshoots the sinusoidal upper current threshold or undershoots the sinusoidal lower current threshold; and
a threshold calculator calculates, at least based on the current demand signal, an oscillating upper current threshold value and an oscillating lower current threshold value both oscillating in phase with the alternating current and establishes a sinusoidal upper current threshold signal representing the oscillating upper current threshold value and a sinusoidal lower current threshold signal representing the oscillating lower current threshold value, a sinusoidal upper current threshold signal output connected to the sinusoidal upper current threshold signal input of the current limiter, and a sinusoidal lower current threshold signal output connected to the sinusoidal lower current threshold signal input of the current limiter,
wherein the sinusoidal upper current threshold and the sinusoidal lower current threshold are derived from the current demand signal by multiplying the current demand signal by gain factors.

10. The inverter control arrangement as claimed in claim 9, wherein the threshold calculator comprises a first adder for deriving the oscillating upper current threshold value by adding a first value to a current demand signal and a second adder for deriving the oscillating lower current threshold value by adding a second value to a current demand signal.

11. The inverter control arrangement as claimed in claim 9, wherein the threshold calculator comprises a first multiplier for deriving the oscillating upper current threshold value by multiplying a current demand signal by a first gain factor and a second multiplier for deriving the oscillating lower current threshold value by multiplying a current demand signal by a second gain factor.

12. The inverter control arrangement as claimed in claim 9, further comprising a minimum pulse timer and/or a hysteresis comparator.

13. An inverter control arrangement for controlling conversion of DC power to a three phase AC power by an inverter using a pulse width modulation switching scheme,
a current controller establishes a plurality of voltage demand signals at least based on a plurality of current demand signals and includes a plurality current demand signal inputs which receives the plurality of current demand signals and a plurality of voltage signal outputs which outputs the plurality of voltage signals;
a pulse width modulation generator includes a plurality of voltage signal inputs connected to the plurality of voltage signal outputs in order to receive the plurality of voltage demand signals, and a gate drive command signal calculator establishes gate drive command signals at least based on the plurality of voltage demand signals according to a pulse width modulation switching scheme; and
a current limiter limits each of the phase currents of a three phase alternating current to be provided by the inverter to a power grid, the current limiter comprises:
a plurality of current feedback signal inputs receive a plurality of current feedback signals from the phase currents of the three phase alternating current, a plurality of sinusoidal upper current threshold signal inputs receive a plurality of sinusoidal upper current threshold signals, a plurality of sinusoidal lower current threshold signal inputs receive a plurality of sinusoidal lower current threshold signals, and a first and second comparator, for each of the plurality of current feedback signals, the first comparator compares the current feedback signal with an associated sinusoidal upper current threshold signal, the second comparator compares the current feedback signal with an associated sinusoidal lower current threshold signal, the modulation switching scheme is amended when the alternating current overshoots the sinusoidal upper current threshold or undershoots the sinusoidal lower current threshold; and for each of the phase currents, a threshold calculator calculates, at least based on the current demand signal, an oscillating upper current threshold value and an oscillating lower current threshold value and establishes a sinusoidal upper current threshold signal representing the oscillating upper current threshold value and a sinusoidal lower current threshold signal representing the oscillating lower current threshold value for each of the plurality of phase currents, an upper current threshold signal output connected to the sinusoidal upper current threshold signal input of the current limiter, and a sinusoidal lower current threshold signal output connected to the sinusoidal lower current threshold signal input of the current limiter, wherein the sinusoidal upper current threshold and the sinusoidal lower current threshold are derived from the current demand signal by multiplying the current demand signal by gain factors.

14. The method as claimed in claim 1, wherein, when the instantaneous value of the alternating current overshoots the sinusoidal upper current threshold or undershoots the sinusoidal lower current threshold, the pulse width modulation switching scheme is replaced by an amended switching scheme comprising switching off at least one power switching device in a phase of the inverter, or by turning on a power switching device that was previously turned off.

15. The inverter control arrangement as claimed in claim 9, wherein the inverter comprises a multi-level inverter and when the instantaneous value of the alternating current overshoots the sinusoidal upper current threshold or undershoots the sinusoidal current threshold, the pulse width modulation switching scheme is replaced by an amended switching scheme adapted to switch off at least one power switching device in a phase of the inverter, or turn on a power switching device that was previously turned off.

* * * * *